Nov. 1, 1955 V. L. ELLIS 2,722,465
BEARING APPARATUS FOR DYNAMIC BALANCING
Filed April 12, 1952 4 Sheets-Sheet 1
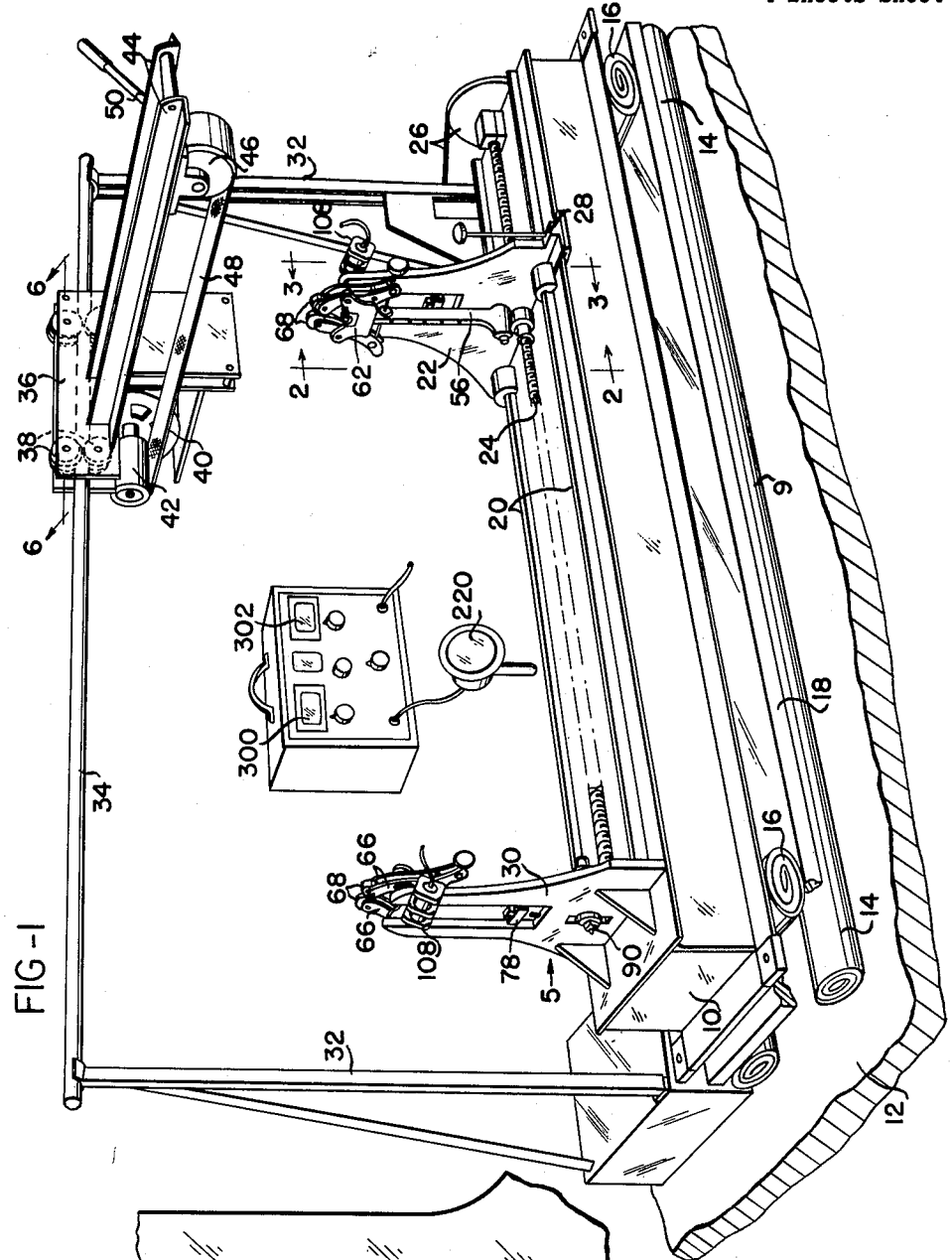
INVENTOR
VONUS L. ELLIS
BY
ATTORNEYS

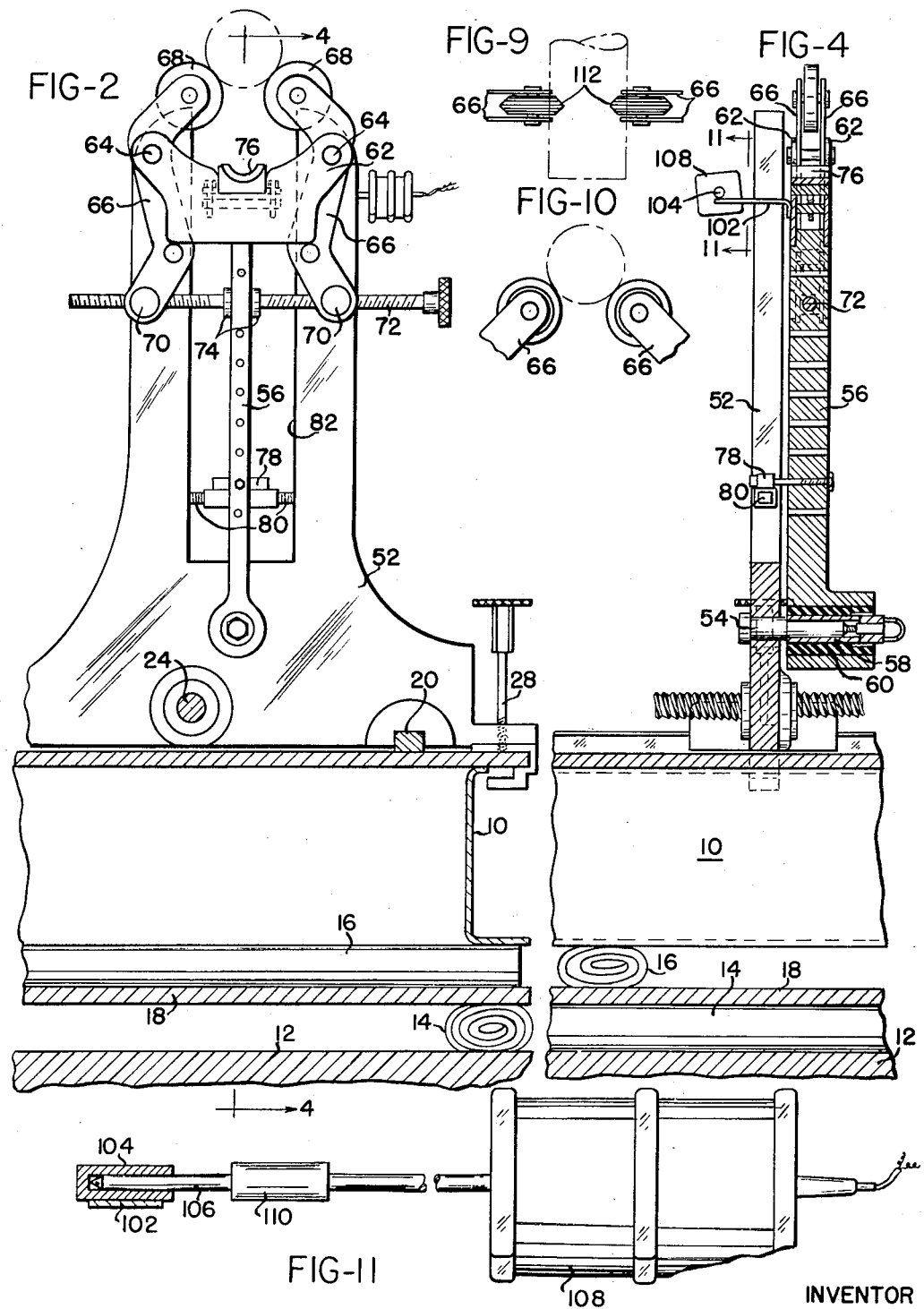

Nov. 1, 1955  V. L. ELLIS  2,722,465
BEARING APPARATUS FOR DYNAMIC BALANCING
Filed April 12, 1952  4 Sheets-Sheet 3
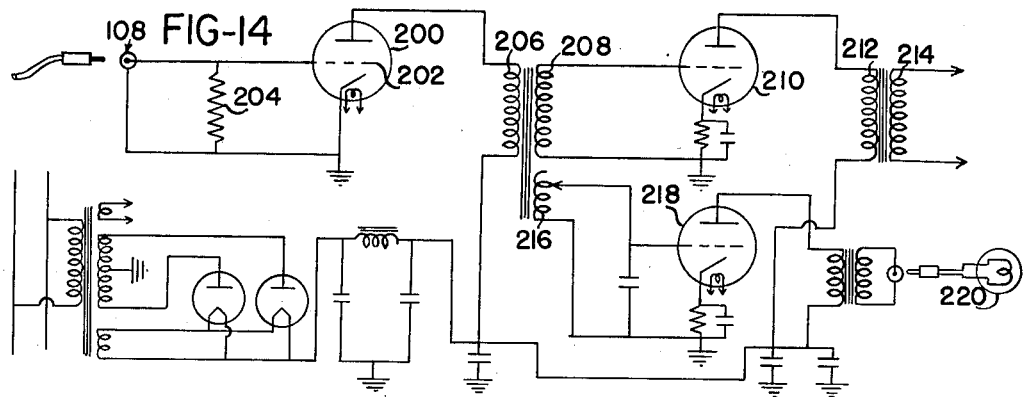
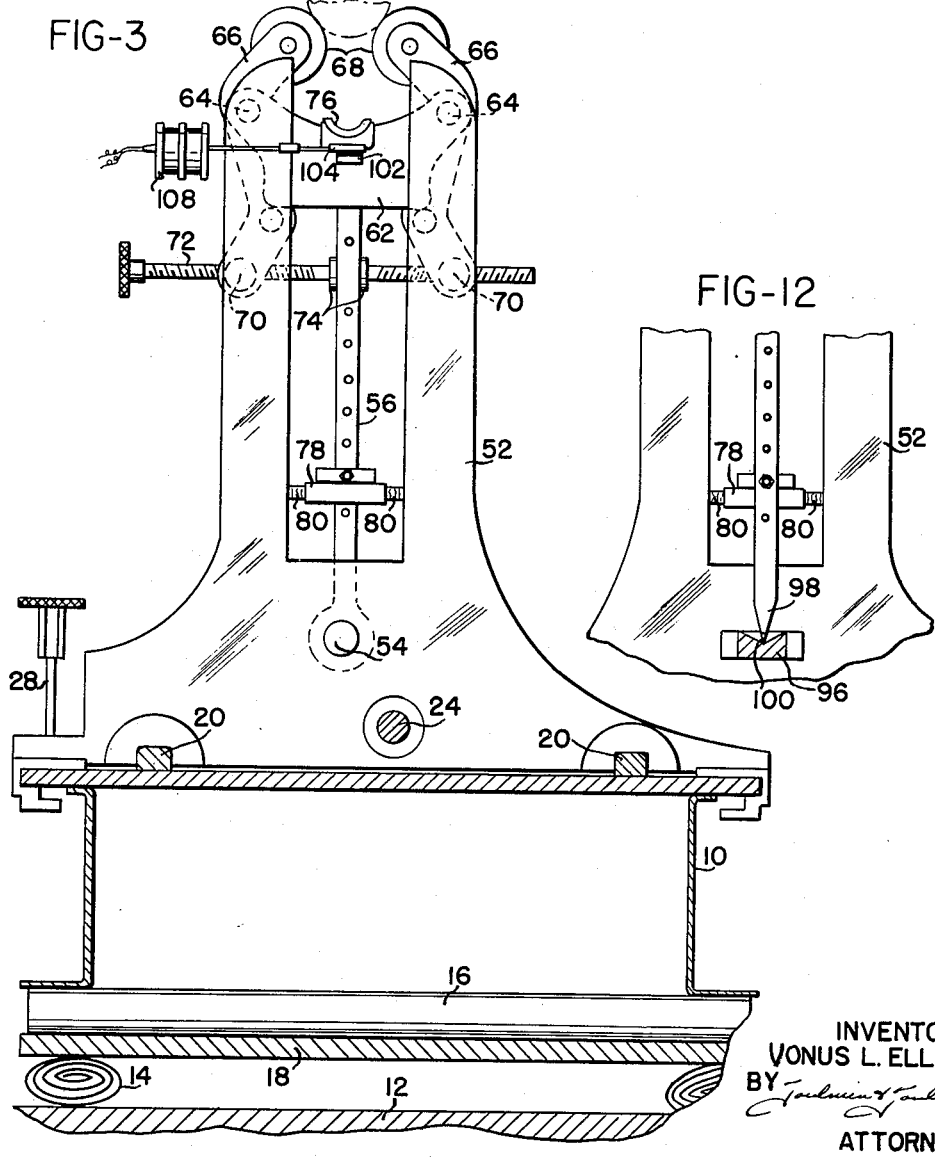
INVENTOR
VONUS L. ELLIS
ATTORNEYS Nov. 1, 1955 V. L. ELLIS 2,722,465
BEARING APPARATUS FOR DYNAMIC BALANCING
Filed April 12, 1952 4 Sheets-Sheet 4
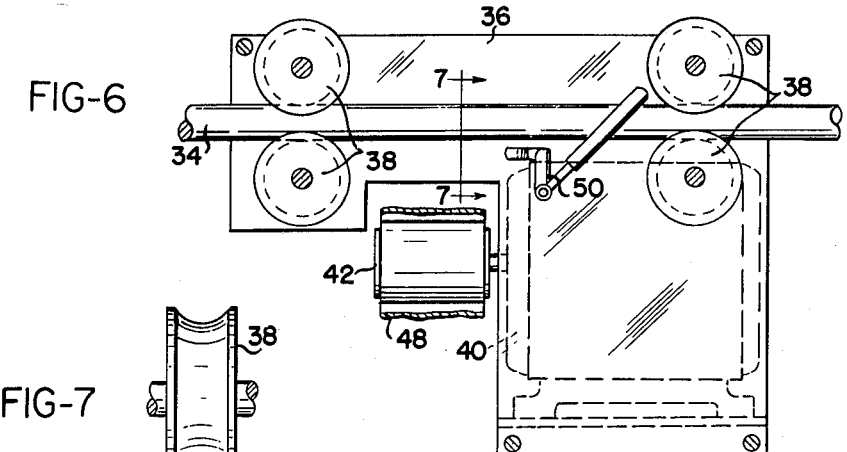
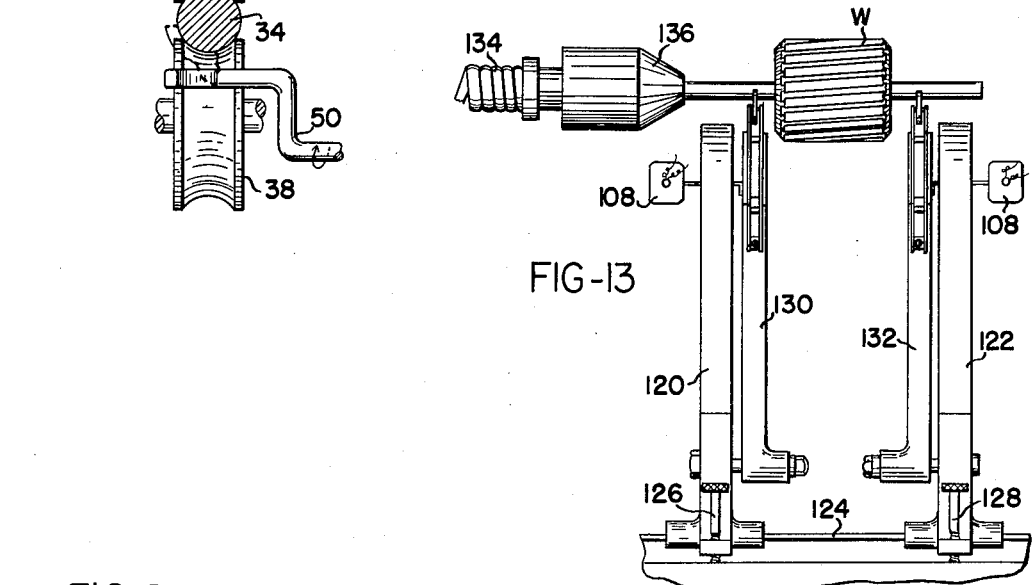
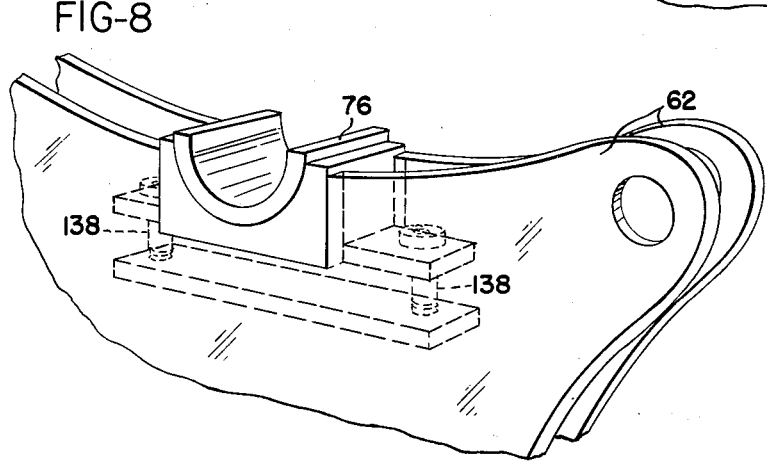
INVENTOR
VONUS L. ELLIS
ATTORNEYS

United States Patent Office 2,722,465
Patented Nov. 1, 1955

2,722,465
BEARING APPARATUS FOR DYNAMIC BALANCING

Vonus L. Ellis, Piqua, Ohio

Application April 12, 1952, Serial No. 281,987

6 Claims. (Cl. 308—28)

This invention relates to a dynamic balancing device, and particularly to a device of this nature having extremely wide adapability and an extremely high degree of sensitiveness.

The need for dynamic balancing rotating machine parts and for detecting unbalanced conditions in assembled machines is constantly met in the machinery art and forms a major problem in connection with certain types of rotating equipment. For example, in electric motors, unless the rotor or armature is carefully balanced at the time of manufacturing, the finished motor will either vibrate excessively or, if the motor frame is sufficiently strong and the mounting of the motor is sufficiently rigid to absorb the vibrations, extreme bearing loading will result that will cause extremely rapid wear to take place on the bearings and shaft of the motor.

In other cases, as in the case of extremely high-speed motors such as are employed in aircraft, certain spinning operations, and the like, the speed of rotation of the rotating members is so high that unless they are balanced within relatively close limits they are unsatisfactory for use.

In still other cases, as in connection with scientific instruments and the like, motors must be provided which are substantially vibration free and the rotating parts of motors of this nature must also be balanced very precisely.

Many other circumstances arise where it is necessary for rotating parts to be closely balanced in order to avoid vibration either in the machine itself, or because of the possibility of the vibrations being transmitted to other equipment.

Heretofore, the balancing of the rotating part, such as an electric motor armature, has been carried out by more or less crude equipment and the balancing accomplished has not been accurate.

Having the foregoing in mind, the primary object of the present invention is the provision of a dynamic balancing device in which a high degree of accuracy of balancing can be obtained.

Another object is the provision of a dynamic balancing machine having a wide range of utility in that it can receive and successfully balance work members of widely varying sizes and characteristics.

A still further object is the provision of a dynamic balancing machine exhibiting a high degree of accuracy and sensitivity but which is nevertheless extremely simple in construction.

Another object is the provision of a dynamic balancing machine in which a high degree of accuracy can be obtained but which is quite simple to operate whereby an ordinary workman can quickly become skilled in its use.

A still further object is the provision of mechanism for balancing rotating members which can be detachably mounted on another machine, such as a lathe, and which other machine provides the rotative effort for turning the part to be balanced.

Another object of this invention is the provision of a dynamic balancing machine in which the sensitivity can be varied.

These and other objects and advantages will become more apparent upon reference to the following description taken in connection with the accompanying drawings, in which:

Figure 1 is a perspective view of one form which the balancing machine according to my invention can take;

Figure 2 is a sectional view indicated by line 2—2 on Figure 1 and showing the workpiece support at one end of the balancing machine;

Figure 3 is a sectional view indicated by line 3—3 on Figure 1 and showing the workpiece support of Figure 2 from the opposite side;

Figure 4 is a vertical section indicated by line 4—4 on Figure 2 showing the workpiece supporting arm in section;

Figure 5 is a fragmentary view looking in the direction of arrow 5 in Figure 1 showing an adjustment in connection with one of the workpiece supporting arms;

Figure 6 is a sectional view indicated by line 6—6 on Figure 1 showing the carriage which is movable along the machine and which carries the driving element for driving the part to be balanced;

Figure 7 is a sectional view on line 7—7 of Figure 6 showing a clamping arrangement provided for locking the carriage in position;

Figure 8 is a fragmentary perspective view showing one of the arrangements for supporting the workpiece to be balanced on the workpiece support;

Figure 9 is a view showing a roller type arrangement for supporting the workpiece;

Figure 10 shows another type of roller support for the workpiece;

Figure 11 shows the manner in which a seismic type pickup is connected with the workpiece supports for picking up the vibrations imported thereto by the piece being balanced;

Figure 12 is a fragmentary view showing a modified arrangement for supporting the vertical members that provide the direct support for the work member being balanced;

Figure 13 is a more or less diagrammatic view showing the manner of associating a dynamic balancing device according to this invention with a lathe;

And Figure 14 is a diagrammatic representation of the electric circuit by means of which amplitude and frequency of the vibrations imparted to the seismic type pickups is analyzed and indicated.

General arrangement

In general, the present invention provides for the detecting of unbalance in rotating workpieces, by rotatably supporting the workpiece on arms which are free to deflect under the forces of unbalance when the workpiece supported thereon is driven. According to this invention, the arms directly supporting the workpiece engage the workpiece at their upper ends, and are pivotally supported at their lower ends.

The arms are provided with resilient means normally determining a neutral, upright position and the resilient means deflects under the forces of unbalance imposed on the arms and the consequent vibration of the arms is picked up by seismic vibration pickup and then analyzed and indicated by a suitably arranged electronic circuit.

Structural arrangement

Referring to the drawings somewhat more in detail, the form of the dynamic balancing machine according to my invention as it is illustrated in Figure 1 comprises a substantially rigid base portion 10 which is supported on the floor 12 by the cushions 14 and 16 with a heavy plate 18 interposed between the side cushions. The cushions may advantageously comprise spiral rubber sheeting with the cushions 14 arranged at right angles to the cushions 16 whereby vibrations will not be transmitted from floor 12 to base 10 of the balancing machine.

Base 10 comprises the longitudinal ways 20 on which is slidably mounted the workpiece support 22. The workpiece support 22 is adapted for being driven longitudinally of ways 20 by lead screw 24 which may be driven by a motor (not shown) which may be connected thereto by the belt and pulley 26. Means such as a clamp screw as at 28 are provided for clamping workpiece support 22 to base 10 at any adjusted position therealong.

At the left end of base 10 there is a stationary workpiece support 30 substantially identical with workpiece support 22 except for an adjustment which will be explained hereinafter.

Mounted on floor 12 in spaced relation with base 10 is a frame 32 which supports a horizontally extending bar 34 along which is movable a carriage 36 which engages the bar as by means of rollers 38.

Carriage 36 supports a multispeed motor 40 that drives a pulley 42. Extending forwardly from carriage 36 over base 10 is a frame 44 that rotatably supports a pulley 46. An endless woven belt 48 passes over pulleys 42 and 46 so that energization of motor 40 will cause movement of belt 48 and this belt can be brought into driving engagement with the periphery of the workpiece to be balanced by moving the carriage 36 along rod 34 and then tilting the carriage about the rod until the belt bears on the piece to be balanced. The multispeed motor 40 provides means for driving the piece to be balanced at any desired speed.

As will be seen in Figure 6, a locking lever 50 is provided which can be operated to lock the carriage against longitudinal movement along the rod 34 while permitting tilting of the carriage. Preferably, the motor 40 and the extending frame 44 are so arranged that the carriage is substantially balanced about rod 34 and thus can readily be tilted.

The belt 48 is advantageously formed of nylon and is likewise advantageously produced on a circular loom so as to be entirely seamless whereby a minimum of vibration is imparted to the work member being balanced by the belt.

Refer now to Figures 2, 3 and 4. These figures will indicate the manner in which the workpiece supports 22 and 30 are made. In these figures it will be noted that the workpiece support comprises the stationary part 52 which has adjacent its bottom a pivot pin 54 that pivotally receives the lower end of the workpiece supporting arm 56. As will be seen in Figure 4, pin 54 has thereon a metal bushing 58 and surrounding the metal bushing is the resilient rubber-like bushing 60.

The arm 56 extends vertically upwardly to adjacent the top of part 52 and supports at its upper end a pair of spaced plates 62 having pivot pins at 64 that receive the arms 66. Arms 66 carry the precision rollers 68 at their upper ends which directly receive the shaft of the work member to be balanced. At their lower ends arms 66 have pivotally mounted therein the nuts 70 that receive the oppositely threaded end portions of adjusting screw 72 that is rotatable in workpiece supporting arm 56 but held against axial movement therein as by the collars 74. The arrangement provides for adjustment of the arms 66 about their pivots 64 in unison but in opposite directions.

The plates 62 also carry between their upper edges the half bearing 76 in which the shaft of a workpiece can be received directly instead of resting on the rollers 68. The half-bearings 76 may be used for very heavy objects or, when objects are badly out of balance, they can be supported on the half-bearings 76 and retained in place by rollers 68.

The workpiece supporting arm 56 has mounted thereon for vertical adjustability a block or holder 78 and which carries at its opposite ends the resilient pads or blocks 80 that engage the opposite side walls of a slot 82 in the frame part 52. The pads or blocks 80 serve to support workpiece supporting arm 56 in a vertical position but yield in response to lateral force exerted on the upper end of the arm on account of the rotation of an unbalanced workpiece supported thereon.

The holder 78 for the pads or blocks 80 is adjustable vertically along the workpiece supporting arm to vary the sensitivity of the machine. For a badly unbalanced workpiece it is preferable for the holder to be adjusted upwardly as far as possible whereas for a workpiece which is only slightly out of balance, a lower position of the holder is to be preferred.

The workpiece supporting arm associated with the stationary workpiece support 30 has its pivot pin 90 vertically adjustable as by means of the slot 92 and the set screw 94. This particular adjustment could be associated with either of the supports 22 or 30 but is advantageously associated with the stationary support.

The workpiece supporting arms may also be supported on a knife edge as illustrated in Figure 12 which shows a V-block 96 stationarily mounted and which receives the V-shaped lower end 98 of the workpiece supporting arm and which lower end may advantageously be provided with a diamond edge as at 100 for eliminating friction and inhibiting excess wear.

The edge of the workpiece supporting arms adjacent its uppermost end has means for receiving a vibration pickup and this means may advantageously comprise a bracket 102 having a cylinder 104 thereon open at one end for receiving a prod 106 leading to a seismic type pickup 108. The pickup is supported merely by the engagement of cylinder 104 by prod 106. Prod 106 may include a filter 110 between its ends for filtering out vibrations of any predetermined frequency range if so desired. Filter 110 is of conventional structure and may consist, for example, of a resilient element which will absorb vibrations of a particular frequency range while being substantially rigid to other frequency vibrations.

The support of the workpiece provided by the rollers 68, when the side rollers are cylindrical as illustrated in Figures 2 and 4, is sometimes at fault due to irregularities in the surface of the shaft. In order to compensate for this, the supporting rollers may be formed so as to present a much narrower surface to the shaft as by the rollers 112 in Figure 9. These rollers may advantageously be formed by laminating and for most purposes will have sufficient strength for supporting the work member being balanced.

It has been mentioned that the device of this invention is adapted for being used with a lathe or the like and an arrangement of this nature is illustrated in Figure 13. In this view the workpiece supports 120 and 122 are slidably mounted on the ways 124 of a lathe bed and are adapted to being clamped rigidly in position by the clamp screws 126 and 128 threaded through the supports 120, 122 and engageable with the lathe bed.

The workpiece supporting arms 130 and 132 carried by the workpiece supports are formed in the same manner as those described for the workpiece supports 22 and 30 so as rotatably to receive a workpiece W at their upper ends. Workpiece W may be driven by connecting it with the spindle of the lathe by means of the flexible connection 134 and the chuck 136, the said chuck preferably being balanced so as not to introduce false vibrations.

In connection with the half bearing 76 previously referred to, reference to Figure 8 will reveal that this half bearing is adapted for being detachably supported at the upper end of the workpiece supporting arm as by the screws 138 so that the said half bearing can be replaced by one of another size to accommodate a different shaft.

The seismic vibration pickup 108 may be connected in an electronic circuit as indicated in Figure 14. In Figure 14, and which is merely intended to be a diagrammatic representation of one manner of detecting and amplifying the signal from the seismic vibration pickup, a detector tube 200 is provided and the signal from the vibration pickup is transmitted to the grid 202 of the tube by means of the resistance 204.

The output of tube 200 feeds the primary 206 of a transformer having a first secondary 208 connected for controlling the output of an amplifier tube 210 that in turn supplies the primary 212 of a transformer having a secondary 214 that is connected to indicators which indicate the amplitude and frequency of the signal from the pickup 108.

Primary 206 also supplies a secondary 216 that controls the output of a tube 218 that supplies a neon lamp 220. The lamp 220 serves as a stroboscope and it will be apparent that the illumination of lamp 220 will occur at exactly the frequency of the vibration picked up by the pickup 108.

Operation

In operation, a work member to be balanced, such as the armature or rotor of an electric motor is placed with its shaft engaged by the rollers at the upper ends of the workpiece supporting arms. These rollers are adjusted so that at each end they have the same spacing whereby the forces transmitted to the workpiece supporting arms by the unbalance of the workpiece are transmitted to both thereof in exactly the same direction.

The carriage 36 is then moved longitudinally along rod 34 until belt 48 is directly above the workpiece. The belt 48 is then brought into engagement with the surface of the workpiece by tilting the carriage and the motor 40 is then energized to run at the proper speed. Normally, the motor 40 will be energized at its lowest speed so that in the case of a severe unbalanced condition the part being balanced will not have a tendency to jump off the supporting arm.

For the same reason, the holders 78 are preferably adjusted to their uppermost position to prevent excessive vibration of the workpiece supporting arms under a badly unbalanced condition.

With the seismic type pickups inserted in the holders therefor, and the workpiece rotating, the instrument 300 will indicate the frequency of the vibration picked up by the pickup and the instrument 302 will indicate the magnitude thereof. At the same time, by illuminating the workpiece by the lamp 220, the exact point of unbalance can be determined.

From the indication of the amplitude of unbalance and the point of unbalance, the work member can either have weight added thereto opposite the point of unbalance or weight taken therefrom at the point of unbalance, then replaced in the balancing machine and again tested for unbalance.

If a high degree of accuracy is desired, the holders 78 are moved progressively downward on the workpiece supporting arms and weight either added to or taken from the work member until it can be rotated without any substantial amount of unbalance being indicated.

It will be apparent that the apparatus of this invention and the method of balancing according to this invention is inherently highly sensitive because the workpiece supporting arms are supported in an inherently unbalanced condition and will deflect the maximum amount for any unbalanced force.

As contrasted to the arrangement of this invention, prior art arrangements employ movable workpiece supporting devices which are inherently stable and in which strong restoring forces will be set up as soon as the workpiece supporting element moves from its neutral and center position.

Accordingly, the device according to the present invention is much more sensitive at all times than the prior art arrangements and will detect and indicate even minute amounts of unbalance.

At the same time, the machine is extremely simple to operate and even an ordinary workman can become skilled in its use after relatively brief instruction.

An important feature of my invention resides in the variability of the resilient means between the arm and its support. By utilizing the variability of this element, it is possible to balance members in my machine without any preliminary static balancing that, heretofore, have always been subjected to such a preliminary step, due to the inability of previous machines to handle a member, particularly one of large mass, having a high degree of unbalance.

In the machine of the present invention, large masses, for example, the face plate of a large lathe, can be placed directly in the machine and the first balancing operation performed therein.

Such a face plate will weigh many hundreds of pounds, and may be severely out of balance, but, by utilizing a stiff resilient element between the arm and its support adjusted to the top of the arm, the arm can be made to deflect a substantial amount only when the force of unbalance is quite high.

Thereafter, after the initial balance is obtained, the resilient element can have the spring action thereof reduced, or be lowered on the arm, or both, and a closer balance of the member obtained.

It will be evident that the degree of resiliency of the resilient element determines the minimum amount of unbalance that will be detected because the arm itself is unstable in the absence of this element. The resilient element likewise determines the maximum force of unbalance the arm will support with a given amount of deflection, and, therefore, solely by varying the resilient element, the machine according to my invention can be adjusted to accommodate large masses having a high degree of unbalance; or to accommodate small masses having only a small degree of unbalance; and to balance both thereof within extremely close limits.

It will be understood that in varying the resilient element, this can be done either by shifting the element along the arm, or by changing the element itself, or both, as particular circumstances indicate.

It will also be understood that in order to receive extremely heavy objects, say, a ton or more, some structural changes in the machine would be made; with relation, however, to the strength only thereof. Similarly, for very small or very high speed objects structural changes would be made to provide for the delicacy of response necessary, but, again, however, without modifying the mode of operation of the machine.

It will be understood that this invention is susceptible to modification in order to adapt it to different usages and conditions, and, accordingly, it is desired to comprehend such modifications within this invention as may fall within the scope of the appended claims.

I claim:

1. In a balancing machine having a base; a vertically extending support arm, means at the top of said arm for rotatably supporting a member to be balanced with its axis at right angles to the axis of said arm, means pivotally supporting the lower end of the arm on said base on an axis parallel to the axis of said member, resilient means mounted on said arm and engaging a portion of said base to laterally bias said arm toward a vertical position while permitting deflection thereof about its pivotal support under forces of unbalance set up in said member when rotated, and means on said arm to vertically adjust said resilient means to vary the degree of bias on said arm, and to provide for adjustment of the sensitivity of said balancing machine.

2. In a balancing machine; a base member, a support mounted on said base member and upstanding therefrom, a vertically extending support arm having its lower end pivotally supported on said support and having means at its upper end for rotatably supporting a member to be balanced with the axis of the member extending at right angles to the axis of said arm, and resilient means carried by one of said supports and support arm and acting laterally on the other thereof to bias said arm toward a vertical position while permitting deflection thereof under forces of unbalance set up in said member when rotated, and means on said arm to vertically adjust said resilient means to vary the degree of bias on said arm and to adjust the sensitivity of said machine.

3. In a balancing machine; a base member, a support mounted on said base and extending vertically upwardly therefrom, a support arm extending vertically, pivot means on said support member engaging the lower end of said arm, said support being provided with a vertically extending slot adjacent said arm, means on the upper end of said arm for rotatably supporting a member to be balanced, and resilient means acting on said arm for biasing it toward a vertical position while permitting deflection thereof under forces of unbalance set up in said member when rotated, said resilient means comprising a holder adapted for being secured to said arm in a plurality of vertically adjusted positions therealong and blocks of resilient material carried by said holder and engaging the side edges of said slot.

4. In a balancing machine; a base, a support member mounted on said base and upstanding therefrom, said support member being provided with vertical slot, a support arm having its lower end pivotally supported on said support and extending upwardly in the plane of the center line of said slot, means on the upper end of said arm for rotatably supporting a member to be balanced, resilient means associated with said arm for biasing it toward a vertical position comprising a holder carried by said arm and adjustable vertically thereof and extending into said slot, and blocks of resilient material carried by said holder and bearing against the opposite side edges of said slot.

5. In a balancing machine; a base, a support member mounted on said base and upstanding therefrom, said support member being provided with a vertical slot, a support arm having its lower end pivotally supported on said support and extending upwardly in the plane of the center line of said slot, means on the upper end of said arm for rotatably supporting a member to be balanced, resilient means associated with said arm for biasing it toward a vertical position comprising a holder carried by said arm and adjustable vertically thereof and extending into said slot, and blocks of resilient material carried by said holder and bearing against the opposite side edges of said slot, the said means at the upper end of said arm for rotatably supporting said member comprising roller means movable in unison toward and away from the vertical center line of said arm whereby the rollers can be accommodated to work members of various sizes.

6. In a balancing machine; a vertically extending support arm, means pivotally supporting the lower end of said arm, means resiliently biasing said arm toward a vertical position, and means on the upper end of said arm for rotatably supporting a member to be balanced, said last-mentioned means comprising plate means on the upper end of said arm, a half-bearing detachably secured to said plate means and roller means pivotally mounted on said plate means and positioned on opposite sides of the vertical center line of said arm, and means for moving said roller means in unison toward and away from the said center line of said arm.

References Cited in the file of this patent

UNITED STATES PATENTS

| | | |
|---|---|---|
| 1,262,999 | Swift et al. | Apr. 16, 1918 |
| 1,347,316 | Akimoff | July 20, 1920 |
| 1,481,785 | Akimoff | Jan. 29, 1924 |
| 1,598,543 | Spicer | Aug. 31, 1926 |
| 1,689,672 | Kasley | Oct. 30, 1928 |
| 1,778,197 | Lord | Oct. 14, 1930 |
| 1,876,523 | Stephenson | Sept. 6, 1932 |
| 2,123,443 | Taylor | July 12, 1938 |
| 2,165,024 | Baker et al. | July 4, 1939 |
| 2,383,588 | Bousky | Aug. 28, 1945 |
| 2,464,662 | Young | Mar. 15, 1949 |
| 2,470,404 | Kloos | May 17, 1949 |
| 2,616,288 | Mesa | Nov. 4, 1952 |

FOREIGN PATENTS

| | | |
|---|---|---|
| 266,759 | Great Britain | June 9, 1927 |